United States Patent Office 3,078,217
Patented Feb. 19, 1963

3,078,217
PROCESS FOR THE PRODUCTION OF
ITACONIC ACID
Mario Batti and Leonard B. Schweiger, Elkhart, Ind.,
assignors to Miles Laboratories, Inc., Elkhart, Ind., a
corporation of Indiana
No Drawing. Filed July 1, 1960, Ser. No. 40,182
5 Claims. (Cl. 195—36)

This invention relates to the production of itaconic acid. In one of its more particular aspects it relates to the submerged aerobic fermentation of carbohydrate media to produce economical yields of itaconic acid.

Itaconic acid, sometimes known as methylene succinic acid, is a dicarboxylic acid having the following structural formula:

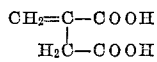

Because of its unsaturaiton, esters of itaconic acid polymerize readily. As a result itaconic acid and its derivatives find considerable application in the fields of synthetic plastics and detergents as well as in the preparation of adhesives.

Itaconic acid has been obtained along with citraconic acid and mesaconic acid by the pyrolysis of citric acid. It has also been prepared by the decarboxylation of cis-aconitic acid upon boiling an aqueous solution thereof. The production of itaconic acid by fermentation has been reported by a number of investigators. First, Kinoshita attributed the production of itaconic acid to an organism which he denominated *Aspergillus itaconicus*. Kinoshita, Acta Phytochim., 5, 271 (1931). Later it was discovered by Calam, Oxford, and Raistrick that itaconic acid could be isolated from *Aspergillus terreus* fermentations. C. T. Calam, A. E. Oxford, and H. Raistrick, Biochem. J., 33, 1488 (1939). Since then several patents have treated the subject of the production of itaconic acid by fermentation. U.S. Patent No. 2,385,283 of Kane, Finlay and Amann described the production of itaconic acid in nutrient carbohydrate solutions by means of submerged aerobic growth of *Aspergillus terreus*. U.S. Patent No. 2,462,981 of Lockwood and Moyer and U.S. Patent No. 2,657,173 of Pfeiffer, Nelson, Vojnovich and Lockwood dealt with the fermentation of relatively dilute carbohydrate solutions. Each of the processes disclosed in these references, however, suffered from the disadvantage of producing itaconic acid in low yields which were economically unattractive. In addition, the media used for the fermentations were generally too dilute to be practical. A publication of Lockwood, L. B. and M. D. Reeves, Arch. Biochem., 6, 455 (1945), explored the effect of various trace elements upon the itaconic acid fermentation. They, in fact, reported that ions of manganese, copper, cobalt, molybdenum, nickel, chromium, gallium or boric acid added to the fermentation media at initial pH values of 2.0, 2.5 and 3.0 did not cause an increase in growth of the itaconic acid producing mycelia or in the production of itaconic acid. However, if the pH was as little as about 2.0 they found that iron and zinc singly caused increased acid production. They further observed that the effect of these two ions was not additive and that if the initial acidity was reduced to pH 3.0 excessive growth of the mold occurred but that very little acid was formed. No effort has apparently been made up to the present time to control the production of itaconic acid by careful control of the concentration of various trace elements.

It is accordingly an object of this invention to provide a process which is capable of producing itaconic acid in appreciably higher yields than the processes of the prior art.

Another object of this invention is to provide a process for the production of itaconic acid which is capable of utilizing more concentrated carbohydrate media.

A further object of this invention is to provide a fermentation medium wherein the composition of the medium is optimum for itaconic acid production.

Yet a further object of this invention is to overcome the effects of undesirable trace elements which may be present in the fermentation media used for the production of itaconic acid.

Another object of this invention is to provide a process for the production of itaconic acid which is economically practicable.

Other objects and advantages of this invention will become apparent in the course of the following detailed disclosure and description.

We have found that itaconic acid production approaching the optimum can be realized by control of the concentrations of certain of the nutrient materials present in the fermentation medium used. Specifically, we have found that the presence of certain concentrations of ions of alkaline earth metals and of copper and/or zinc are essential to the satisfactory production of itaconic acid by the submerged aerobic fermentation of carbohydrate media. More particularly, a certain balance between the concentration of alkaline earth metal ions and ions of copper or zinc is necessary for maximum itaconic acid production as will be described in detail.

The process of the instant invention may be generally described as the submerged aerobic fermentation of a carbohydrate medium having present therein a certain critical concentration of ions of an alkaline earth metal as well as copper or zinc ions in addition to the usual nutrients supplied in fermentations of this type. The organism to be used may be any itaconic acid producing organism. A particularly preferred class of organisms is itaconic acid producing strains of *Aspergillus terreus*, which have been found to produce very satisfactory yields of itaconic acid.

The carbohydrate medium used for the purpose of the itaconic acid fermentation may be a solution of any carbohydrate capable of yielding itaconic acid on fermentation. For example, glucose, sucrose, starch hydrolysates, fructose, invert sugars, molasses, corn syrups, beet or cane sugar syrups, citrus molasses, affination sugar or other carbohydrates may be used. In order to provide a medium which is not contaminated with undesired ionic species it is generally preferred to use a deionized sugar solution for the fermentation medium and to add to the deionized medium whatever nutrient materials are desired. Deionization of course can be accomplished by well known ion exchange techniques which are capable of eliminating a substantial proportion of the undesirable elements which may be present in the sugar solution.

The sugar solution may be used in a range of sugar content expressed as percent of sucrose by weight of from about 10% to 25% in contrast to the prior art processes which utilized a sugar content of only about 7%. Thus solutions having concentrations of from twice to three times as high as those used in the prior art processes may be advantageously used in the process of this invention to produce correspondingly higher yields of itaconic acid based upon carbohydrate used.

A nutrient to be added to the fermentation medium generally includes sources of nitrogen, phosphorus, potassium and other elements essential to the growth of the organism used in the fermentation. For example, nitrogen nutrients may be utilized in various forms such as ammonia, ammonium carbonate $$(NH_4NH_2CO_2 \cdot NH_4HCO_3)$$

ammonium nitrate, ammonium sulfate or ammonium hydroxide. Other ammonium salts may be similarly utilized. The nitrogen source preferred for most fermentations is ammonium carbonate since it can be added in solid form and dissolves readily to make the nitrogen available to the organism. In addition to the nitrogen nutrients various phosphates may be used to furnish the organism with the phosphorous necessary for its growth. Potassium dihydrogen phosphate, $KH_2PO_4$, has been found effective not only as a source of phosphorus but also potassium. Other materials are also effective to promote the growth of the organism and these may be used in various forms. Magnesium, for example, may be furnished as the sulfate, $MgSO_4 \cdot 7H_2O$ and iron as the chloride $FeCl_3 \cdot 6H_2O$. However, as will be pointed out, the presence of iron, particularly in large quantities, is not desirable and in fact may prevent the production of itaconic acid by the organism if its effect is not counteracted by the provision of other suitable nutrients.

The hydrogen ion concentration of the fermentation medium is generally adjusted to a hydrogen ion concentration of above about pH 3.0 and preferably in the range of from about pH 3.0 to pH 4.0. A convenient way to adjust the fermentation medium to the desired pH is by the addition of ammonia gas. Later additions of ammonia gas may be used to raise the pH of the fermenting medium. This later addition is usually accomplished at from about 48 hours to 60 hours after inoculation of the fermentation medium.

The fermentation may be conducted at any desired temperature. However, somewhat elevated temperatures, for example 85° F. to 95° F., and preferably 90° F. to 95° F. are more desirable. The fermentation may be conducted for a period of time sufficient to obtain the desired yields of itaconic acid, generally for a period of from about 160 hours to 200 hours.

As pointed out above, this invention is concerned with the use in the fermentation medium of nutrient materials in addition to those generally used. More specifically, a quantity characterized as more than that generally used in the case of trace elements of an alkaline earth metal ion together with what could be characterized as trace amounts of copper or zinc or mixtures of copper and zinc is required. The alkaline earth metal ion as well as the other metallic ions are furnished in the form of soluble salts of the metals. For example, calcium ions can be furnished as any of a number of soluble calcium salts, for example chloride, sulfate, phosphate, nitrate, lactate or itaconate. Any other soluble salt capable of furnishing calcium ions to the fermentation medium may likewise be used. Other alkaline earth metal ions are also effective for this purpose, such as barium, strontium or magnesium. While it is known that magnesium is a necessary nutrient for the growth of the organism and production of itaconic acid it has not heretofore been appreciated that magnesium could be used in greater than trace amount quantities to produce increased yields of itaconic acid. Neither had it been appreciated that calcium, barium or strontium could be used for this purpose. The alkaline earth metal ions should be furnished to the fermentation medium in a concentration of from about 350 p.p.m. to about 3500 p.p.m. of the metal ion, for example, in the case of calcium chloride as $$CaCl_2 \cdot 2H_2O$$

This would mean a concentration of the salt of from about 0.13% to 1.3% by weight.

An essential feature of this invention is that in addition to the alkaline earth metal ion there must also be present in the fermentation medium a minimum concentration of a metal ion selected from the group consisting of copper ions as $Cu++$ and zinc ions as $Zn++$. These ions may be similarly furnished as any ionizable salt of the metal such as the sulfate, chloride, carbonate, nitrate and the like. In the case of the ions of copper and zinc a minimum concentration of from about 0.5 p.p.m. to 100 p.p.m. and preferably from about 1 p.p.m. to 50 p.p.m. of the metal ion is required. If desired, a mixture of copper and zinc up to about 200 p.p.m. may be used. The copper and zinc ions may be effectively added not only at the beginning of the fermentation, but also at later times in the fermentation cycle, for example, at 24, 48, or 60 hours after the beginning of the fermentation.

The precise concentration of the copper and/or zinc ions used in the fermentation medium is dependent upon a number of factors including the concentration of iron in the fermentation medium. It is known that concentrations of iron of as little as about 1 p.p.m. greatly decrease the yields of itaconic acid obtained in the fermentation. However, if copper or zinc is used in such a fermentation it is found that satisfactory yields of product are obtained even in the presence of iron. Not only is the concentraiton of copper and zinc with respect to the amount of iron in the medium critical, but the concentration of iron, copper and zinc must be adjusted with respect to the concentration of alkaline earth metal ions such as calcium. In general it is found that the use of an alkaline earth metal ion alone, without adding copper or zinc ions, is ineffective to produce satisfactory yields of itaconic acid. However, use of a combination of an alkaline earth metal ion such as calcium, and either copper or zinc ions is found to produce near optimum yields of product. As an example of the advantage of utilizing the process of this invention, in one case where the calcium chloride content of the fermentation medium was 0.6% and copper and zinc ions were omitted the weight yield of itaconic acid from an 11.6% invert sugar soluiton after 161 hours of fermentation was 16%. Using 1 p.p.m. each of copper and zinc ions in a similar fermentation together with the same concentration of calcium chloride the weight yield of itaconic acid was 51.5%. On the other hand where copper and zinc ions were added in a concentration of 3 p.p.m. each and the calcium ion was omitted from invert sugar solutions of 12.84% sugar content the weight yield of itaconic acid was 3.5%. However, when 1.2% of calcium chloride was added the weight yield rose to 47.3%. Thus it can be seen that by using the process of the instant invention greatly improved yields of itaconic acid may be realized.

This invention will be better understood by reference to the following examples which are included for purposes of illustration and are not to be construed as in any way limiting the scope of this invention which is defined in the appended claims.

EXAMPLE I

To 4 liters of a solution of defecated decationized high test syrup solution of 13% sugar content as equivalent sucrose was added 0.2% $NH_4NH_2CO_2 \cdot NH_4HCO_3$, 0.1% $MgSO_4 \cdot 7H_2O$, 0.014% $KH_2PO_4$, 3 p.p.m. $Zn++$ as $ZnSO_4 \cdot 7H_2O$, 3 p.p.m. $Cu++$ as $CuSO_4 \cdot 5H_2O$ and 1.2% $CaCl_2 \cdot 2H_2O$. The resulting mixture was inoculated with a suspension of *Aspergillus terreus* NRRL 1960. The fermentation medium was aerated at 1.25 volumes air per minute during the first 24 hours and at the rate of 1.5 volumes air per minute thereafter. Fermentation was continued for a period of 184 hours. The results obtained at various initial pH's are shown in Table 1.

Table 1

| pH | Spore Germination | Itaconic Acid Produced, g. | Yield Itaconic Acid Based on Sugar | |
|---|---|---|---|---|
| | | | Supplied, percent [1] | Consumed, percent [2] |
| 2.49 | Very slow | 136 | 24.7 | 95.1 |
| 3.05 | Normal | 291 | 57.8 | 89.6 |
| 3.50 | Fairly Rapid | 291 | 57.5 | 90.4 |
| 4.0 | Rapid | 277 | 55.0 | 98.9 |

[1] $\frac{\text{Grams Itaconic Acid Produced}}{\text{Grams Sugar Supplied}} \times 100$.

[2] $\frac{\text{Grams Itaconic Acid Produced}}{\text{Gram Sugar Consumed} \times \frac{260}{342}} \times 100$.

This assumes that one mole of hexose or one half mole sucrose yields one mole itaconic acid.

From these data it can be seen that the use of an initial pH of above about pH 3 is desirable in order to obtain practical yields of itaconic acid.

The following example illustrates the effect of the concentration of iron in the fermentation medium upon the yields of itaconic acid.

EXAMPLE II

The procedure of Example I was followed, except that the sugar content was 13.6% of sucrose. The amount of ammonium carbonate used was 0.24%, and the initial pH was 3.2. The pH was readjusted to 3.2 after 138 hours of fermentation by the addition of $NH_4OH$. The initial concentration of $Cu++$ and $Zn++$ was 3 p.p.m. each as before, and the concentration of $Ca++$ as $$CaCl_2 \cdot 2H_2O$$

was 2700 p.p.m. Various quantities of iron, $Fe+++$, supplied as $FeCl_3 \cdot 6H_2O$ were supplied to the fermentation medium. The results of this experiment are summarized in Table 2 below.

Table 2

| Iron, p.p.m. | Itaconic Acid Produced, Grams | Weight Yield,[1] percent |
|---|---|---|
| 0 | 321 | 57 |
| 1 | 140 | 25 |
| 2 | 99 | 17 |
| 4 | 98 | 17 |

[1] 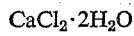 $\frac{\text{Grams Itaconic Acid Produced}}{\text{Grams Sucrose Supplied}} \times 100$.

These data show that iron concentrations of as little as about 1 p.p.m. adversely affect the production of itaconic acid.

The following example illustrates the effect of copper and zinc in counteracting the adverse effects of iron in the itaconic fermentation media.

EXAMPLE III

The procedure of Example II was followed except that the fermentation medium contained 13.68% sucrose and varying concentrations of copper and zinc salts, some of which were added at the start of fermentation and some at 20 hours to 24 hours after inoculation. The quantity of itaconic acid produced was determined after 160 hours of fermentation. The data are summarized in Table 3 below.

Table 3

| Total copper and zinc | | Iron, p.p.m. | Itaconic acid produced, grams |
|---|---|---|---|
| at start, p.p.m. | at 20-24 hours, p.p.m. | | |
| 0 | 12 | 0 | 269 |
| 0 | 12 | 0.5 | 365 |
| 0 | 12 | 1.5 | 366 |
| 0 | 12 | 3 | 318 |
| 3 | 12 | 0 | 213 |
| 3 | 12 | 0.5 | 354 |
| 3 | 12 | 1.5 | 358 |
| 3 | 12 | 3 | 355 |

These data show that apparently 12 p.p.m. total copper and zinc is not quite enough to counteract the presence of 3 p.p.m. of iron, but that 15 p.p.m. total copper and zinc is adequate since the production of itaconic acid dropped from 366 g. in the case of 1.5 p.p.m. iron to 318 g. in the case of 3 p.p.m. iron where 12 p.p.m. copper and zinc were present, whereas the production of itaconic acid was maintained at about the 350 g. level for concentrations of iron ranging from 0.5 p.p.m. to 3 p.p.m. where the total copper and zinc present was 15 p.p.m.

The following example illustrates the relationship between the concentrations of copper and zinc ions in the process of this invention.

EXAMPLE IV

The procedure of Example I was followed with the following variation. Defecated, decationized high-test syrup which contained 11.6% sucrose was used as the carbohydrate medium with 0.6% $CaCl_2 \cdot 2H_2O$ at a pH of 3.3. The aeration rate was 1.25 volumes air per minute. Concentrations of copper and zinc supplied as the sulfates were varied independently. The resulting data for a 161 hour fermentation are shown in Table 4 below.

Table 4

| Zinc, p.p.m. | Copper, p.p.m. | Itaconic acid produced grams | Weight yield itaconic acid, percent |
|---|---|---|---|
| 0 | 0 | 74 | 16 |
| 0.5 | 0 | 201 | 43.3 |
| 1.0 | 0 | 205 | 44.2 |
| 3.0 | 0 | 196 | 42.2 |
| 6.0 | 0 | 234 | 50.4 |
| 0.5 | 0.5 | 257 | 55.4 |
| 1.0 | 0.5 | 240 | 51.7 |
| 3.0 | 0.5 | 244 | 52.6 |
| 6.0 | 0.5 | 257 | 55.4 |
| 0.5 | 1.0 | 243 | 52.4 |
| 1.0 | 1.0 | 239 | 51.5 |
| 3.0 | 1.0 | 241 | 51.9 |
| 6.0 | 1.0 | 243 | 52.4 |
| 0.5 | 2.0 | 248 | 53.4 |
| 1.0 | 2.0 | 247 | 53.2 |
| 3.0 | 2.0 | 224 | 48.2 |
| 6.0 | 2.0 | 229 | 49.4 |

These data show that addition of the zinc ions alone causes a considerable improvement in the yield of itaconic acid but that the presence of both zinc and copper ions results in even greater yields. It is to be noted that the relationship between the concentration of zinc and copper ions may vary over relatively wide ranges without an appreciable effect upon the yield of itaconic acid so long as a minimum concentration of zinc and/or copper ions is present.

The following example illustrates the inter-relationship between calcium ions and copper ions in the production of itaconic acid.

EXAMPLE V

The procedure of Example I was followed using a defecated, decationized high-test syrup containing 12.84% sucrose to which was added 0.014% $KH_2PO_4$, 0.1% $MgSO_4 \cdot 7H_2O$, 0.2% $NH_4NH_2CO_2 \cdot NH_4HCO_3$ and 3 p.p.m. zinc as $ZnSO_4 \cdot 7H_2O$. The concentrations of $CaCl_2 \cdot 2H_2O$ and copper ions as $CuSO_4 \cdot 5H_2O$ were varied. The resulting data are shown in Table 5 below.

Table 5

| Copper, p.p.m. | $CaCl_2 \cdot 2H_2O$, percent | Itaconic acid produced, grams | Weight yield, percent |
|---|---|---|---|
| 0.5 | 0.6 | 284 | 58.2 |
| 0.5 | 1.2 | 277 | 56.8 |
| 1 | 0 | 11 | 2.25 |
| 1 | 0.6 | 272 | 55.7 |
| 1 | 1.2 | 273 | 55.9 |
| 2 | 0.6 | 248 | 50.8 |
| 2 | 1.2 | 277 | 56.8 |
| 3 | 0 | 17 | 3.5 |
| 3 | 0.6 | 178 | 35.5 |
| 3 | 1.2 | 231 | 47.3 |
| 6 | 0 | 18 | 3.7 |
| 6 | 0.6 | 164 | 35.5 |
| 6 | 1.2 | 154 | 31.6 |
| 9 | 0 | 14 | 2.7 |
| 9 | 0.6 | 103 | 21.1 |
| 9 | 1.2 | 124 | 25.4 |
| 12 | 0 | 12 | 2.5 |
| 12 | 0.6 | 86 | 17.6 |
| 12 | 1.2 | 115 | 23.6 |

These data show that when calcium ions were omitted completely that practically no itaconic acid was formed. It was noted that at the lowest copper levels growth was adequate to excessive. Addition of greater concentrations of copper ion was found to result in restricted growth with chlamydospore formation.

The following example illustrates the necessity for having a divalent alkaline earth metal salt present for optimum itaconic acid production.

EXAMPLE VI

The procedure of Example I was followed using a defecated, decationized high-test syrup containing 13.6% sugar content as sucrose. The fermentation medium also contained 0.014% $KH_2PO_4$, 0.1% $MgSO_4 \cdot 7H_2O$, 0.2% $NH_4NH_2CO_2 \cdot NH_4HCO_3$, and 3 p.p.m. each of copper and zinc sulfates. The pH was 3.3. The data taken after 185 hours of fermentation which show the effect of using various monovalent and divalent metal chlorides are given in Table 6 below.

Table 6

| Metal salt | Cation added, p.p.m. | Itaconic acid produced, grams | Weight yield, percent |
|---|---|---|---|
| None | 0 | 48 | 9 |
| $CaCl_2 \cdot 2H_2O$ | 337 | 235 | 43 |
| $CaCl_2 \cdot 2H_2O$ | 675 | 263 | 48 |
| $CaCl_2 \cdot 2H_2O$ | 1,350 | 284 | 52 |
| $CaCl_2 \cdot 2H_2O$ | 2,700 | 321 | 59 |
| $MgCl_2 \cdot 6H_2O$ | 337 | 110 | 20 |
| $MgCl_2 \cdot 6H_2O$ | 675 | 169 | 31 |
| $MgCl_2 \cdot 6H_2O$ | 1,350 | 251 | 46 |
| $MgCl_2 \cdot 6H_2O$ | 2,700 | 262 | 48 |
| KCl | 337 | 25 | 5 |
| KCl | 675 | 21 | 4 |
| KCl | 1,350 | 16 | 3 |
| KCl | 2,700 | 15 | 3 |

These data show that both calcium chloride and magnesium chloride are effective to produce satisfactory yields of itaconic acid whereas potassium chloride is not. In a similar experiment sodium chloride was also shown to be ineffective whereas barium chloride used as $BaCl_2 \cdot 2H_2O$ gave satisfactory yields of itaconic acid.

The following example illustrates the use of various calcium sources in the production of itaconic acid.

EXAMPLE VII

The procedure of Example I was followed using a defecated, decationized high-test syrup containing 0.2% $NH_4NH_2CO_2 \cdot NH_4HCO_3$, 0.014% $KH_2PO_4$, and 0.1% $MgSO_4 \cdot 7H_2O$. The pH was about 3.3–3.5. Various calcium salts were used in place of the calcium chloride specified in the previous examples. The quantities of copper and zinc ions, the sugar content of the medium, and the pH were also varied. The resulting data are shown in Table 7 below.

Table 7

| Calcium Salt | Percent | Copper, p.p.m. | Zinc, p.p.m. | Sucrose, Percent | pH | Itaconic Acid Produced, Grams | Weight Yield, Percent |
|---|---|---|---|---|---|---|---|
| lactate | 0.063 | 3 | 3 | 13.6 | 3.3 | 125 | 23 |
| lactate | 0.126 | 3 | 3 | 13.6 | 3.3 | 287 | 53 |
| itaconate | 0.1 | 48 | 48 | 14.2 | 3.55 | 300 | 53 |
| $Ca(OH)_2$ | 0.054 | | | | | | |
| Itaconic Acid | | 15 | 15 | 12.4 | 3.5 | 286 | 58 |
| | 0.17 | | | | | | |
| $Ca(NO_3)_2 \cdot 4H_2O$ | 0.2 | 15 | 15 | 12.4 | 3.4 | 300 | 60 |
| $Ca(H_2PO_4)_2 \cdot H_2O$ | 0.1 | 24 | 24 | 11.3 | 3.4 | 267 | 59 |
| $CaSO_4$ | 0.275 | 48 | 48 | 13.4 | 3.4 | 313 | 55 |
| $CaSO_4$ | 0.55 | 48 | 48 | 13.4 | 3.38 | 318 | 59 |
| $CaCl_2 \cdot 2H_2O$ | 0.3 | 6 | 6 | 13.4 | 3.32 | 298 | 56 |
| $CaCl_2 \cdot 2H_2O$ | 0.6 | 6 | 6 | 13.4 | 3.27 | 313 | 58 |

These data show that various salts of calcium may be used effectively in the process of this invention to produce satisfactory yields of itaconic acid.

The following example illustrates the use of a single salt of calcium in varying concentrations and with varying copper and zinc ion concentrations.

EXAMPLE VIII

The procedure of Example I was followed using calcium sulfate as the calcium salt and standard defecated, decationized high-test syrup with 0.2%

$$NH_4NH_2CO_2 \cdot NH_4HCO_3$$

0.014% $KH_2PO_4$, and 0.1% $MgSO_4 \cdot 7H_2O$ added. The results are summarized in Table 8 below.

Table 8

| $CaSO_4$, Percent | Copper, p.p.m. | Zinc, p.p.m. | Itaconic Acid Produced, grams | Weight Yield, Percent |
|---|---|---|---|---|
| 0.27 | 6 | 6 | 221 | 41.3 |
| 0.27 | 12 | 12 | 284 | 53.1 |
| 0.27 | 24 | 24 | 276 | 51.6 |
| 0.27 | 48 | 48 | 293 | 54.8 |
| 0.55 | 6 | 6 | 198 | 37.0 |
| 0.55 | 12 | 12 | 305 | 57.0 |
| 0.55 | 24 | 24 | 285 | 53.3 |
| 0.55 | 48 | 48 | 318 | 59.4 |

These data show that the requirements of the fermentation for calcium, copper and zinc ions are interrelated and that various concentrations of calcium ion may be used if the concentrations of copper and zinc ions are appropriately adjusted.

In summary, this invention consists in furnishing to the fermentation medium used for the production of itaconic acid a greater than trace amount of an alkaline earth metal ion and trace amounts of copper or zinc ions or mixtures thereof. The resulting fermentations are capable of producing itaconic acid in high yields using more highly concentrated carbohydrate solutions than was previously possible.

What is claimed is:

1. A process for the production of itaconic acid by the submerged aerobic fermentation of a carbohydrate which comprises inoculating an aqueous carbohydrate medium having a concentration of from about 10% to 25% expressed as sucrose with an itaconic acid producing strain of *Aspergillus terreus*, said carbohydrate medium containing a mixture of from about 350 p.p.m. to 3500 p.p.m. of an alkaline earth metal ion and from about 0.5 p.p.m. to 200 p.p.m. of a cation selected from the group consisting of copper ions and zinc ions, and having a pH of above about 3.0 allowing the inoculated carbohydrate medium to ferment under aerobic conditions for a period of from about 160 to 200 hours, and recovering itaconic acid from the resulting fermentation broth.

2. A process for the production of itaconic acid by the submerged aerobic fermentation of a carbohydrate which comprises inoculating an aqueous carbohydrate medium having a concentration of from about 10% to 25% expressed as sucrose with an itaconic acid producing strain of *Aspergillus terreus*, said carbohydrate medium containing from about 350 p.p.m. to 3500 p.p.m. of an alkaline earth metal ion, from about 0.5 p.p.m. to 200 p.p.m. of copper ions, and from about 0.5 p.p.m. to 200 p.p.m. of zinc ions, and having a hydrogen ion concentration of from about pH 3.0 to pH 4.0, allowing the inoculated carbohydrate medium to ferment under aerobic conditions for a period of from about 160 hours to 200 hours and recovering itaconic acid from the resulting fermentation broth.

3. A process for the production of itaconic acid by the submerged aerobic fermentation of a carbohydrate which comprises inoculating an aqueous carbohydrate medium having a concentration of from about 10% to 25% expressed as sucrose with an itaconic acid producing strain of *Aspergillus terreus*, said carbohydrate medium containing from about 350 p.p.m. to 3500 p.p.m. of an alkaline earth metal ion, from about 1 p.p.m. to 50 p.p.m. of copper ions, and from about 1 p.p.m. to 50 p.p.m. of zinc ions, and having a hydrogen ion concentration of from about pH 3.0 to pH 4.0, allowing the inoculated carbohydrate medium to ferment under aerobic conditions for a period of from about 160 hours to 200 hours and recovering itaconic acid from the resulting fermentation broth.

4. A process according to claim 1 wherein the alkaline earth metal ion is $Ca^{++}$.

5. A process according to claim 1 wherein the concentration of the cation selected from the group consisting of copper ions and zinc ions is maintained at 0.5 p.p.m. to 200 p.p.m. throughout the course of the fermentation.

References Cited in the file of this patent

UNITED STATES PATENTS

| 2,674,561 | Moyer | Apr. 6, 1954 |
| 2,970,084 | Schweiger | Jan. 31, 1961 |

FOREIGN PATENTS

| 795,401 | Great Britain | May 21, 1598 |

OTHER REFERENCES

Moyer et al.: Article in Archives of Biochemistry, vol. 7, pp. 167–183, 1945, Academic Press, N.Y.

Buendia et al.: Rev. cienc apl. (Madrid), vol. 12, 481–495 (1958), T4R4; abstracted in Chemical Abstracts, vol. 53, page 19290 (1959).